United States Patent
Thompson

(10) Patent No.: US 9,934,068 B2
(45) Date of Patent: Apr. 3, 2018

(54) DATA ANALYSIS SYSTEM

(75) Inventor: Simon Gilles Thompson, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 595 days.

(21) Appl. No.: 14/235,589

(22) PCT Filed: Jul. 27, 2012

(86) PCT No.: PCT/GB2012/000620
§ 371 (c)(1),
(2), (4) Date: Jan. 28, 2014

(87) PCT Pub. No.: WO2013/017816
PCT Pub. Date: Feb. 7, 2013

(65) Prior Publication Data
US 2014/0173622 A1    Jun. 19, 2014

(30) Foreign Application Priority Data

Jul. 29, 2011 (EP) .................................... 11250683

(51) Int. Cl.
*G06Q 40/00* (2012.01)
*G06Q 30/00* (2012.01)
*G06F 17/30* (2006.01)
*G06Q 30/02* (2012.01)
*G06F 9/50* (2006.01)

(52) U.S. Cl.
CPC ........ *G06F 9/5005* (2013.01); *G06F 17/3089* (2013.01); *G06F 17/30873* (2013.01)

(58) Field of Classification Search
CPC .... G06F 9/5061; G06F 9/5072; G06F 9/5011; G06F 17/30292; G06F 9/5005; G06F 17/30873; G06F 17/3089; G06F 17/30867; H04L 67/10; G06Q 30/02; G06Q 30/0273; G06Q 30/0269; G06Q 30/08
See application file for complete search history.

(56) References Cited

U.S. PATENT DOCUMENTS

| | | | | |
|---|---|---|---|---|
| 7,590,406 B2* | 9/2009 | Aaltonen | .......... | G06F 17/30867 455/405 |
| 8,694,409 B2* | 4/2014 | Chassin | ............... | G06Q 20/102 361/1 |
| 8,849,761 B2* | 9/2014 | Prahlad | ................. | G06F 17/302 707/640 |

(Continued)

OTHER PUBLICATIONS

Curescu et al., A Bidding Algorithm for Optimized Utility-Based Resource Allocation in Ad Hoc Networks, Dec. 2008, 18 pages.*

(Continued)

*Primary Examiner* — Thuy Dao
(74) *Attorney, Agent, or Firm* — Nixon & Vanderhye P.C.

(57) ABSTRACT

The present invention, provides a method of data analysis in which data subscriptions are defined and data for that subscription be collected for analytical purposes. Supplemental queries based on new information received can be generated automatically and old queries can be eliminated automatically on the basis that they are rendered obsolete in. terms of not providing novel information in comparison to other queries and their results not being used.

14 Claims, 3 Drawing Sheets

(56) References Cited

U.S. PATENT DOCUMENTS

| | | | | |
|---|---|---|---|---|
| 8,849,955 B2* | 9/2014 | Prahlad | ............... | G06F 17/302 709/211 |
| 8,990,825 B1* | 3/2015 | Martin | ............... | G06F 9/5005 718/104 |
| 2004/0158618 A1* | 8/2004 | Shaw | ............... | H04W 4/00 709/217 |
| 2006/0007870 A1* | 1/2006 | Roskowski | ............ | H04L 43/00 370/252 |
| 2006/0259621 A1* | 11/2006 | Ranganathan | ......... | G06F 1/206 709/226 |
| 2007/0098014 A1* | 5/2007 | Pomaranski | ....... | H04L 12/5695 370/468 |
| 2008/0140621 A1 | 6/2008 | Martinez et al. | | |
| 2008/0295139 A1* | 11/2008 | Aaltonen | ............... | G06F 21/10 725/87 |
| 2009/0125910 A1* | 5/2009 | Lazarus | ............... | G06F 9/5011 718/104 |
| 2010/0205169 A1 | 8/2010 | Narayan et al. | | |
| 2010/0299432 A1 | 11/2010 | Emanuel et al. | | |
| 2011/0004513 A1* | 1/2011 | Hoffberg | ............ | G06Q 30/0207 705/14.1 |
| 2011/0016214 A1* | 1/2011 | Jackson | ............... | G06F 9/5044 709/226 |
| 2012/0102200 A1* | 4/2012 | Rabii | ................... | G06F 9/5011 709/226 |

OTHER PUBLICATIONS

Koutsopoulos et al., Auction Mechanisms for Network Resource Allocation, Jul. 2010, 10 pages.*

Sui et al., An Adaptive Bidding Strategy in Multi-Round Combinatorial Auctions for Resource Allocation, Jun. 2009, 8 pages.*

International Search Report for PCT/GB2012/000620 dated Nov. 7, 2012.

F. Naoki et al., "Periodical Resource Allocation Using Approximated Combinatorial Auctions", Intelligent Agent Technology, 2007, IAT '07. IEEE/WIC/ACM International Conference on, IEEE, Nov. 2, 207, pp. 434-441.

* cited by examiner

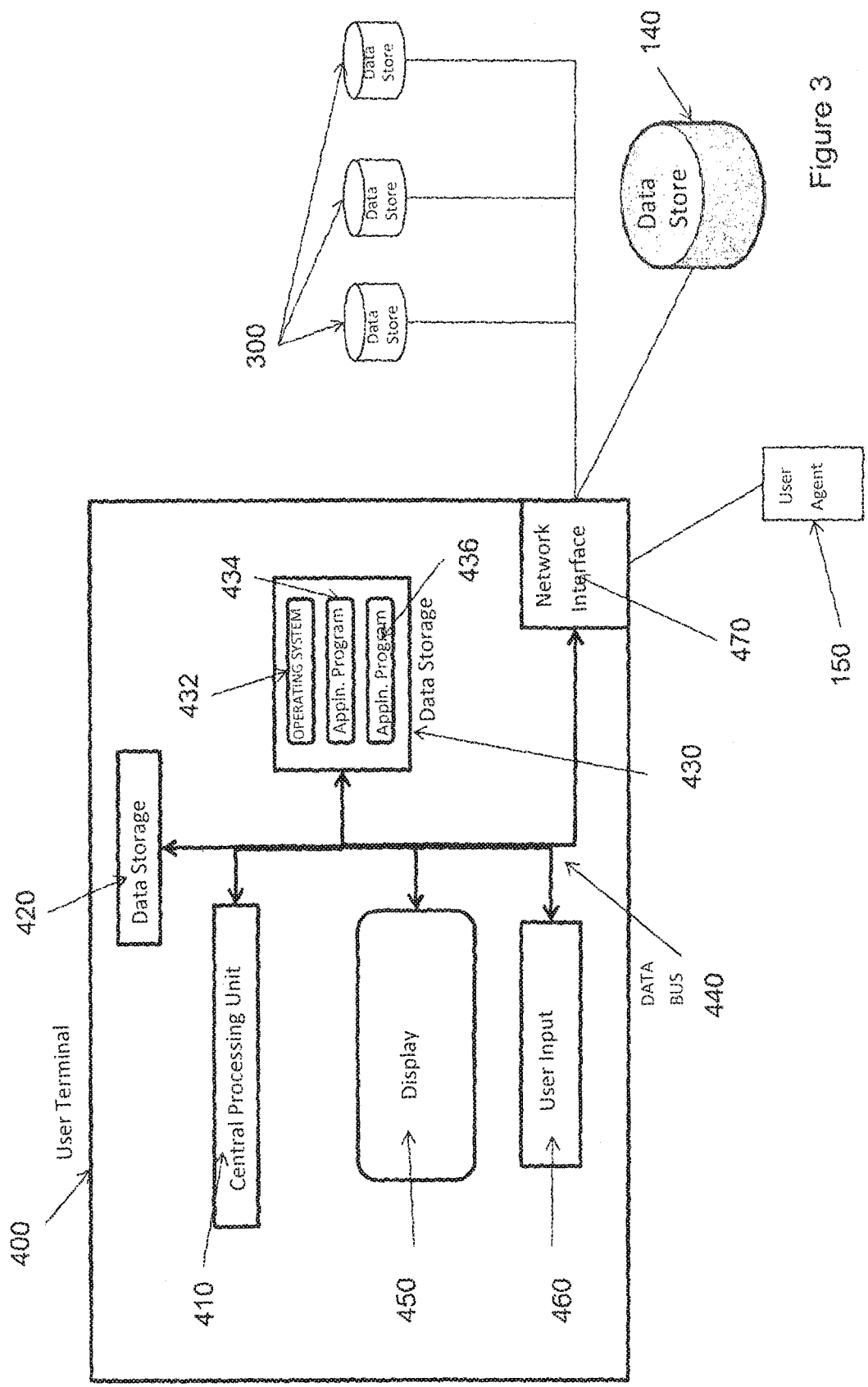

DATA ANALYSIS SYSTEM

This application is the U.S. national phase of International Application No. PCT/GB2012/000620 filed 27 Jul. 2012 which designated the U.S. and claims priority to EP 11250683.7 filed 29 Jul. 2011, the entire contents of each of which are hereby incorporated by reference.

BACKGROUND AND SUMMARY

The present invention relates to a method of data analysis and in particular to a method of analysing a selected sub-set of data.

The expansion of the internet and the development of it as a mass consumer resource has caused it to evolve from a distributed data system to a distributed information store—information here meaning data which can be can used to answer questions—in which information is created and processed by millions of humans using the internet every day.

Information mediation and distribution services such as Twitter, Facebook and RSS feed aggregators like Google Reader enable users to construct subscriptions to particular topics or sites of interest. The result of these information feeds can then be searched or browsed by a user. This approach provides the advantage that the collected content was of interest to the user at the time that the information was obtained. However, the users search preference may have changed between the time that the information feed was established and the time that the information is reviewed or analysed and only the information that was searched for is retained.

An alternative approach is to attempt to gather all information and store it, or index it, in a massive index such as a search engine like Google. This allows a user to establish subscriptions as queries over the main index, which can be widened at any time to cover any other information that has been stored in the index. Clearly, such an approach is infeasible for all but the most powerful enterprises. Potentially Google could provide sophisticated query capability on its centralized hardware, however the Google infrastructure (previously Map-Reduce, now Caffeine) is specialised in terms of providing a particular style of query capability in a massively scalable but cost effective way (see for example, M Stonebraker "*SQL databases v. NoSQL databases*", Communications of the ACM, Volume 53 Issue 4 Apr. 2010).

This means that queries that intensively cross reference the results of previous queries (such as recursively constraining and expanding result sets based on the information held in the previous result set) are unlikely to be scalable using such an indexing infrastructure, in particular unless a query writer is aware of the physical distribution of data and results queries cannot be constructed in a way that enables them to most efficiently process and move data and results during the query answering process. Such problems are likely to be more significant if results need to be cross-referenced with proprietary information that must be loaded to the infrastructure (in some cases it may not be possible to upload such data, for example in order to comply with data protection regulation, reasons of privacy or national security, etc.). In addition multiple sources of data may exist that are not licensed for public consumption and may be held privately on other infrastructures. Subscriptions to these information sources are made by humans via various interfaces, for example Twitter RSS feeds or tools such as Co-Tweet. These subscriptions bring data from the large scale internet stores and communities into a local data processing unit where it may be efficiently processed.

According to a first aspect of the present invention there is provided a system comprising: a first data store, a communications interface to one or more further data stores, a resource allocation manager, a plurality of data subscriptions; and one or more user terminals; the system being configured, in use, such that; the resource allocation manager selects one or more data subscriptions from the plurality of data subscriptions; the selected one or more data subscriptions cause data to be selected from the one or more further data stores and transferred to the first data store.

The system may further comprise a plurality of user agents, each user agent being associated with one or more of the plurality of data subscriptions, the user agents being configured to, in use, transmit a bid for system resources for the one or more associated data subscriptions to the resource allocation manager. The system resources may comprise data storage capacity and/or processing means capacity. The system may further comprise one or more user terminals for analysing the data associated with the selected one or more data subscriptions and transferred to the first data store.

The system may be configured, in use, to periodically update the data associated with the selected one or more data subscriptions and transferred to the first data store.

The one or more data subscriptions may be constructed from data relating to a social media network entity. The data relating to a social media network entity may comprise one or more further social media entities. The one or more data subscriptions may further comprise one or more keywords.

The present invention addresses the issue of maintaining the subscriptions of users to large scale data resources in the face of the change of relevance and interest in these subscription over time and the opportunities for retrieval of items that may be of interest to the human user of the system in the future but are unknown to the user at the time when the item is retrieved. Whereas a complete mirror of all large scale resources would achieve this, the resource available to the user are constrained and the present invention balances the acquisition of information with the cost of gathering it from, for example, the internet, storing it and answering queries from it.

According to a second aspect of the present invention there is provided a method of analysing data, the method comprising the steps of: i) defining a plurality of data subscriptions; ii) a resource allocation manager selecting one or more of the plurality of data subscriptions; iii) selecting data associated with the selected one or more data subscriptions; and iv) transferring the data selected in step iii) to a first data store.

According to a third aspect of the present invention there is provided a tangible data carrier for use in a computing device, the data carrier comprising computer executable code which, in use, performs a method as described above.

BRIEF DESCRIPTION OF THE DRAWINGS

Embodiments of the present invention will now be described, by way of example only, with reference to the accompanying drawings in which

FIG. 3 shows a schematic depiction of a user terminal.

DETAILED DESCRIPTION OF PRESENT EXAMPLE EMBODIMENTS

Figure 1:
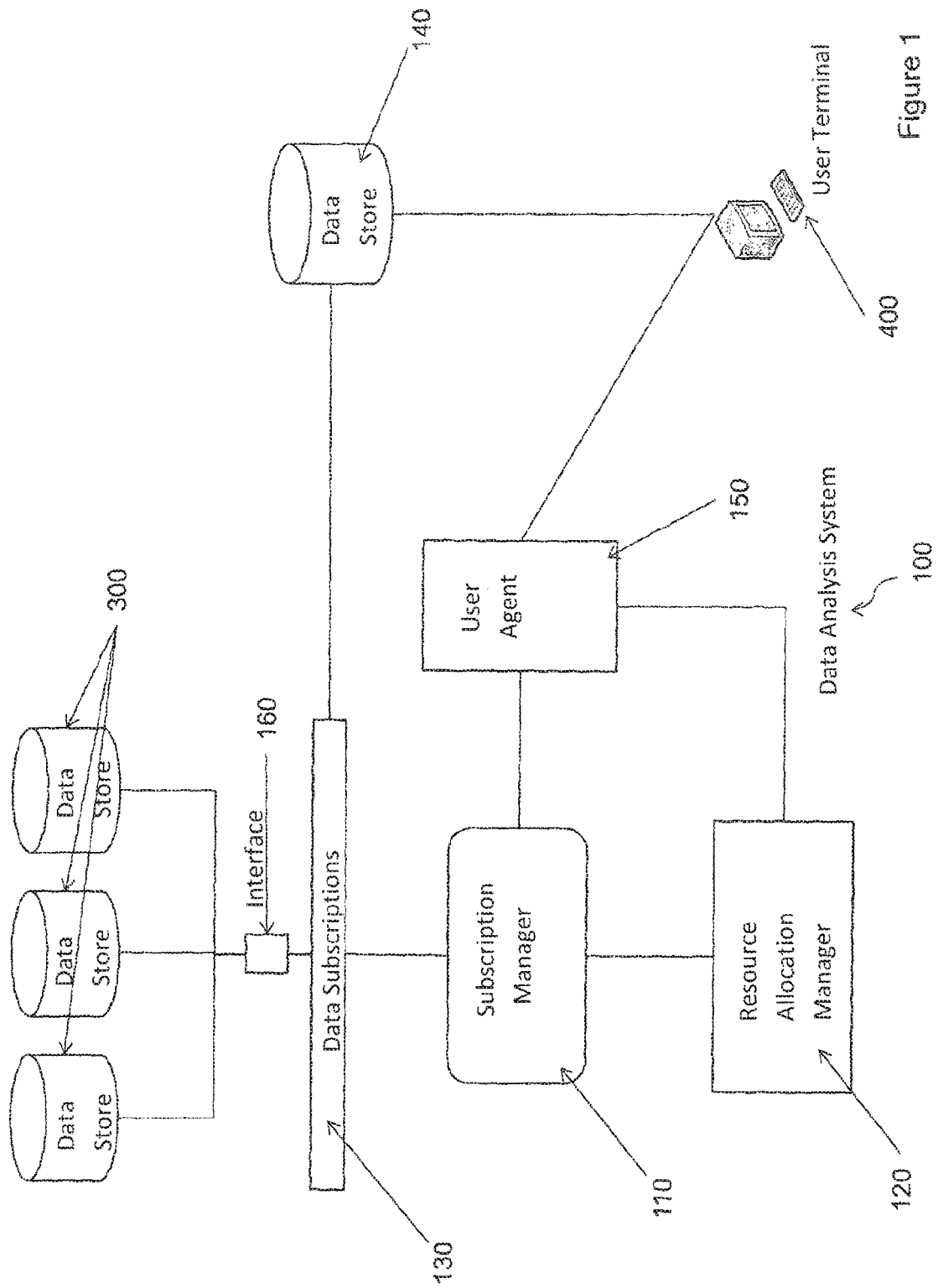
FIG. 1 shows a schematic depiction of a data analysis system according to the present invention.

FIG. 1 shows a schematic depiction of a data analysis system 100 according to the present invention. The system 100 comprises a subscription manager 110, resource allocation manager 120, one or more data subscriptions 130, interactive data store 140, one or more user agents 150 and communications interface 160. A user terminal 400 is used to create communication sessions with the user agent 150 and the interactive data store 140. Data that is held within the interactive data store can be queried and analysed by sending appropriate commands and instructions from the user terminal 400. The results of these queries may then be displayed or visualised on the monitor of the user terminal. Data that is held within one of a plurality of remote data stores 300 is selected in accordance with one or more of the data subscriptions 130 and this selected data is then copied to the interactive data store for querying and analysis.

A simple example of a subscription is given below (prefix "http://" has been omitted):

```
While {
    Store += Query
    (search.twitter.com/search.atom?q=from.BTCare);
    Wait (___sometime);
}
```

This subscription would comprise the information created by the entity BTCare, that is a history of the tweets sent by BTCare over a particular period of time. The subscription may also comprise metadata regarding the tweets, such as, for example: the number of characters published; the number of distinct unigrams published, the most common unigram published, the times of day that publication occurred, the number of followers that BTCare has, etc. Once this first data subscription has been defined, it is then possible to construct further subscriptions, such as (prefix "http://" has been omitted):

```
followers = getFollowers (BTCare);
forall ( follower.followers) {
    subscriptions += Query
    (search/twitter.com/search.atom?q=from:" + follower);
}
```

This subscription identifies each of the followers of BTCare and then collects data, or metadata, regarding each of the followers. Again, this data may comprise the contents of the messages sent and/or data related to those messages. It will be understood that it is possible to generate subscriptions automatically, for example by:
  detecting a reference to a data generating entity or person; for example in the form of an explicit reference ("@simon") or indirectly ("it reminds me of something Simon Thompson said"). This subscription could be qualified by the activity type or social network memberships of the data generating entity—the agent might retrieve data from the entity's feed and analyse it to discover if it contains relevant references, or the agent may retrieve the public contact list of the entity and look for similarities or differences to the follow list that it is currently tracking
  detecting a new keyword or that the use of a particular word has crossed some threshold (for example frequency of use or number of occurrences)
  detecting the occurrence of an existing keyword in a context that demonstrates that it belongs to a different concept class from that which was previously detected broadening an existing subscription beyond a specific keyword to a general concept class of words.

After each phase of data retrieval, or after each data retrieval event, the agent potentially could generate one or more new subscriptions based on the new data that it receives. It should be noted that the new subscriptions that the agent can create are limited by the decisions to create subscriptions or to delete subscriptions that have previously been made. Items of potential interest to the user may appear in information streams that are not presently monitored by the agent and may therefore not be used to construct new subscriptions.

Each of the subscriptions yield data and the gathering and storage of this data consumes some of the resources that support the activity of the user agent, for example bandwidth, processor capacity, or disk space. In particular, the agent will store the results of the subscription in the interactive data store 140. This interactive data store is suited for high speed interactive queries, in contrast to conventional data stores held on wide area networks (for example the Google Index) that are only suitable for simple retrieval operations due to the geographic distribution of data items in the data centres in the network. This data store will have a limited capacity due to the problem of computational load becoming intractable over very large data sets for some queries, and economic and technical constraints noted above that determine that the store is not implemented over a wide area network so choosing what data to place in this store is a significant decision. The plurality of remote data stores 300 may be distributed over a wide area network, such as the internet, or they may be geographically near to the interactive data store but comprise the sort of data storage which are only suitable for simple retrieval operations.

The agent as noted above is able to determine algorithmically a number of potential new subscriptions that it could adopt either broadening the categories of item that it is watching, adding new items based on associations with watched items or monitoring new individuals or organisations activities based on their social affinity with currently watched individuals or organisations. Thus, the creation of a new subscription is as simple as extracting the existence of a new individual from a stream by parsing the @simon annotation from the stream and substituting the string into appropriate predefined template subscriptions which are then used to query various information sources about this new person. In the case of items those familiar with the state of the art will recognize that there are algorithms that can extract entities of interest from text snippets. For example, one could remove all "stop words" that were stored in a list of said stop words such as adjectives, adverbs, interjections and pronouns and treat all remaining words (verbs, nouns) as candidate expansions.

In order to manage the data store the agent must make a decision about which subscriptions to maintain, which subscriptions to create or to add and which subscriptions to remove at each step of its operation. One possible method for making these decisions is to use an auction of resource utilization permissions. An auction can be run periodically, in which each agent is allocated a share of the various resources required to support particular subscriptions. Each agent in the system is allocated a share of resources based on user preferences and the value of the information gathered so far by the agent with respect to the use that is made of the information in the interactive store, for example how many visualisations have been created that use some of that information, how many times those visualisations have been accessed, etc.

It will be readily apparent to those skilled in the art that a number of processes for implementing a resource allocation method of this sort could be devised. For example, a first in first out list could be maintained, a list ordered by freshness of activity in the streams could be maintained. Outlined below is an example of an auction process that could be used.

In the exemplary auction process, the subscriptions that the agent wishes to maintain for a particular time period are allocated a cost based on the estimated utilization of resources during that time period. This cost may be estimated using the specificity of the query (wide queries being expensive whereas more refined queries are cheaper) and/or based on the history of the query, or similar queries, in the past. The agent may decide to post a bid for resource to support the query, with the agent ranking each of their associated bids such that the bids can be prioritised.

The agent will make this decision based on the amount of utilization made by the users of the system of the data previously gathered by the subscriptions and by the difference of the data gathered from these subscriptions in comparison to other subscriptions maintained. Thus subscriptions that produce data that is often utilized in analysis undertaken by the systems users and which produce data that is substantially different from other subscriptions will be highly valued. Thus a subscription that produced data that was frequently used in analysis and which produced data that is disjoint from the data produced by other systems would be highly valued by an agent and therefore the agent would allocate a large proportion of its expected resource allocation to bidding for that subscription to be maintained in the system.

Typically a system will comprise one or more agents, each of which are managing one or more subscriptions. Thus, for each round of the auction the agents will post a set of ranked bids with the resource allocation manager. Those bids which have the highest priority will have the greatest probability of being accepted. The resource allocation manager will order all of the bids from all of the agents in accordance with their respective ranking, and will then allocate resources until all of the resource assigned to each agent, or all of the total system resource, has been allocated. If there is not sufficient resource to fulfil a particular bid then the resource allocation manager may terminate the resource allocation process. Alternatively, the resource allocation manager may elect to fulfil one or more lower-ranked bids which have a lower cost and which can be fulfilled with the remaining resources.

For example, consider an auction which is run for a system which has a total of 35 resource units available and which comprises first user agent 150a which has 10 units of resource with which to bid and second user agent 150b which has been allocated 20 units of resource.

TABLE 1

| Bids from first user agent 150a | | | | | | | | |
|---|---|---|---|---|---|---|---|---|
| Item | A | B | C | D | E | F | G | H |
| Ranking | 1.0 | 0.99 | 0.98 | 0.5 | 0.4 | 0.3 | 0.2 | 0.1 |
| Cost | 1.0 | 3.2 | 1.0 | 5.0 | 1.0 | 1.0 | 1.0 | 1.0 |

TABLE 2

| Bids from second user agent 150b | | | | | | | | |
|---|---|---|---|---|---|---|---|---|
| Item | I | J | K | L | M | N | O | P |
| Ranking | 1.0 | 0.9 | 0.8 | 0.7 | 0.6 | 0.5 | 0.4 | 0.3 |
| Cost | 1.0 | 1.0 | 1.0 | 1.0 | 7.0 | 8.0 | 9.0 | 11.0 |

It can be seen from Tables 1 & 2 that bids A & I will be processed first (as they both have a ranking of 1), followed by bids B, C, J, K, L, M, D&N, E&O, F&P, G and then H. The first user agent is successful with bids A, B and C but has only 4.8 units of resource available whilst the next prioritised bid is for item D which has a cost of 5 resource units. The second user agent is successful with bids I, J, K, L M and N. After these bids have been accepted the second user agent has 1 unit of resource unallocated and the next bid has a cost of 9.

At this point, one of a number of different options may be selected. As neither user agent has sufficient resource allocation left to be able to support their next bids, then the resource allocation manager may simply terminate this round of the auction process and allow the successful bids (namely bids A, B, C, I, J, K, L M and N) to be executed. However, this is inefficient in respect of the fact that the overall system capacity is 35 resource units and the accepted bids are for only 24.2 resource units.

Given that the total system resource is greater than the combined allocations for the first and second user agents then it is possible to assign some or all of the excess capacity to bids that could not be satisfied because the user agent in question did not have sufficient remaining allocated resource to satisfy their bids in the priority that was applied. Thus, in the present example it would be possible to accept bid D, which has a cost of 5 resource units, as this uses the 4.8 units of resource that was unused by the first user agent and 0.2 units of resource from the 5 units of resource that was not allocated to a user agent. The second user agent has 1 unit of resource remaining and there is only 4.8 units of unallocated resource so it is not possible to process either bid O or bid P, as the cost of each of these bids is greater than the remaining resource.

The suction process may then be terminated at this point. However, it can be seen from Table 1 that the first user agent made bids E, F, G & H which were assigned a low priority and had a low cost. These four bids could be executed using the 4.8 units of unallocated resource, meaning that the resource allocation manager is able to execute all of the submitted bids for which there is sufficient resource to execute the bids.

Figure 2:
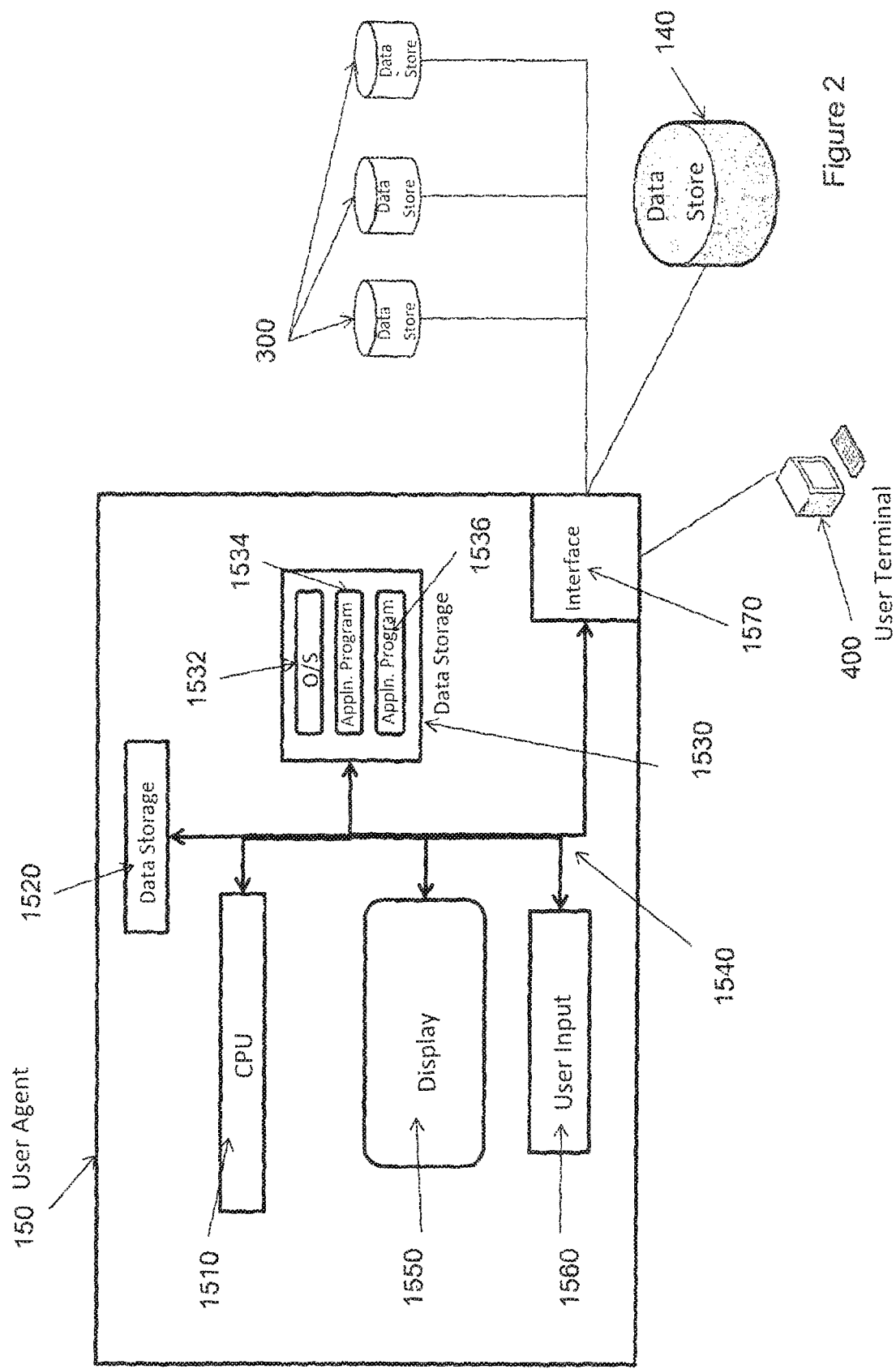
FIG. 2 shows a schematic depiction of a general computing device which can be used to implement a data analysis system according to the present invention.

It will be understood that the user agent 150 may comprise one or more computer programs that are executed by a general purpose computing device. FIG. 2 shows a schematic depiction of such a general computing device which constitutes a user agent 150, which comprises one or more central processing units 1510, one or more volatile data storage means 1520 and one or more non-volatile data storage means 1530, which are interconnected by data bus 1540. The apparatus further comprises display means 1550, user input means 1560 and network interface 1570. The network interface 1570 enables communication with the user terminal 400, interactive data store 140 and the plurality of remote data stores 300. Furthermore, the network interface may comprise a local area network adaptor, with the LAN being connected to other LANs and wide area networks (WANs). Alternatively, the network interface may be a DSL modem, or similar, that provides a connection to a WAN, such as the internet or an intranet, which enables communications with further networks.

The user terminal 150 may comprise integrated display means and user input means, for example a touch screen, for they may be separate, for example a conventional display screen and a keyboard and/or mouse. The non-volatile data storage means may comprise one or more hard disc drives; in addition there may be provided removable non-volatile data storage means, such as removable hard disc drives or optical media (for example re-writable or recordable DVDs). Alternatively, the interactive data store may form a part of the general computing device 150 and may be implemented using random access memory (RAM) or a solid state disk (SSD) or other similar fast response data storage means.

The non-volatile data storage means 1530 comprises an operating system 1532 and one or more application programmes 1534 and 1536. The operating system comprises the software that the computing apparatus requires to operate, communicate with other computers, receive input from users, display outputs and results to users, etc. Application programs 1534 and 1536 can be executed by the apparatus in order to provide additional functionality. The functionality of the user agents, resource allocation manager and the subscription manager may be provided by one or more applications programs. It will be understood that the exact structure of the general purpose computing apparatus is not important as long as it is capable of executing the computer code which performs a method according to the present invention. Such computer code may be deployed to such a general purpose computing apparatus via download, for example via the internet, or on some physical media, for example, DVD, CD-ROM, USB memory stick, etc.

Similarly, the user terminal 400 comprises a general purpose computing device, as has been described above with reference to the user terminal 300. Preferably the user terminal 400 is a laptop or desktop computer which can query and analyse the data held in the interactive data store using a conventional browser program such as, for example, Microsoft Internet Explorer. It will be understood that other browser programs may be used, or a bespoke application may be provided for accessing the data held in the interactive data store, and that other forms of computer, for example such as a tablet computer or smartphone may be used to access the interactive data store.

FIG. 3 shows a schematic depiction of a user terminal 400 which comprises one or more central processing units 410, one or more volatile data storage means 420 and one or more non-volatile data storage means 430, which are interconnected by data bus 440. The apparatus further comprises display means 450, user input means 460 and network interface 470. The network interface 470 enables communication with the user agents 150, interactive data store 140 and the plurality of remote data stores 300. The non-volatile data storage means 430 comprises an operating system 432 and one or more application programmes 434 and 436.

The bidding and the ranking of bids can be performed in a co-operative manner, with the bids and rankings of each user agent being communicated to each of the other user agents after the resource allocation manager has assigned system resources to the bids. For example, if the second user agent has an interest in the subscription that is represented by bid B and the first user agent has repeatedly bid for that subscription then the second user agent can focus their interest on bidding for other subscriptions. However, if the first user agent reduces the priority of the bids that are made for then this may cause the second user agent to make their own bid for the subscription represented by B.

The ranking of the bids from the first user agent shows another tactic in putting a number of low cost bids at a low priority. The highly ranked bids will be processed using the resource allocated to the first user agent whilst the lower ranked bids may be processed using unused and/or unallocated resource. As the lower-ranked bids have a low cost there is a greater chance that the bids can be accepted. In contrast, the lower ranked bids of the second user agent are for subscriptions with a high cost so there is a lower probability that there will be sufficient resource to enable these bids to be accepted.

It will be understood to those skilled in the art that the foregoing description of an auction process is just one example and that variations of that auction process, or alternative processes that allocate resource to the user agents may be used. For example, if one of the user agents has unused allocated resource and there is insufficient system resource to support the execution of any further bids from that user agent then that resource may be used to support the execution of further bids from one or more of the other user agents, even if the other user agents have used all of their allocated resource. In some cases, such as that described above, where there is spare resource in the system that has not been allocated to a user agent this excess resource may be allocated to requests which exceed a user agent's allocation.

Alternatively, all of the system resource may be allocated between the plurality of user agents, or there may be insufficient system resource to allow all of the user agent resource allocations to be used. The level of system resource allocated to each user agent may be determined on their need, on the basis of their historic use of resource, or it may be linked to the amount of payment received. If a user agent submits a set of bids which does not use all of the allocated resource then the unused resource may be reclaimed by the resource allocation manager for allocation to one or more other user agents. Alternatively, the user agent may transfer the unused resource to another user agent.

Rather than allocating system resources in general, they may be allocated on a more granular level, for example allocations of bandwidth, data storage, memory, CPU cycles, etc. If the data analysis system is provided on a commercial basis to users who are unrelated then information regarding the bids and ranking may not be provided to the other user agents.

The choice of which subscriptions are provisioned is significant for two reasons. First it determines the information that is available in the interactive data store for analysis by the human user. Secondly it determines the future information that is available to the system for use in generating new subscriptions and therefore for delivering new and interesting information to the human user.

The auction process is carried out periodically. It is possible that the data subscriptions obtained from the previous instance of the auction process may not be fully analysed before the next instance of the auction process is scheduled. In such a case, the user agent may use their located resource to maintain their current subscriptions until the required data analysis is complete.

In summary, the present invention provides a method of data analysis in which data subscriptions are defined and data for that subscription be collected for analytical purposes. Supplemental queries based on new information received can be generated automatically and old queries can be eliminated automatically on the basis that they are rendered obsolete in terms of not providing novel information in comparison to other queries and their results not being used.

What is claimed is:

1. A method, executed by software instructions stored in memory of a computing device, of analysing data, the method comprising the steps of:
   i) defining a plurality of data subscriptions, each of the data subscriptions comprising one or more data item and one or more associated metadata items;
   ii) a resource allocation manager selecting one or more of the plurality of data subscriptions, the selection of the one or more data subscriptions being made in accordance with bids for system resources received from a plurality of user agents, each user agent being associated with one or more of the plurality of data subscriptions;
   iii) selecting data associated with the selected one or more data subscriptions;
   iv) transferring the data selected in step iii) to a first data store, and
   v) analyzing the data transferred in step iv) using one or more user terminals, the one or more user terminals being connected to the first data store via a communications interface.

2. The method of claim 1, wherein at least one of the data subscriptions is generated automatically by detecting a reference to a data generating entity or person.

3. The method of claim 1, wherein at least one of the data subscriptions is generated automatically by detecting that use of a particular word has crossed a threshold of frequency of use by particular word.

4. The method of claim 1, wherein at least one of the data subscriptions is generated automatically by detecting that use of a particular word has crossed a threshold of number of occurrences by that particular word.

5. A non-transitory storage medium, for use in a computing device, the non-transitory storage medium storing computer executable code which, upon execution of the computing device, performs the method according to claim 1.

6. A data analysis system comprising:
   a first data store,
   a communications interface to one or more further data stores,
   a resource allocation manager,
   a plurality of data subscriptions, each of the data subscriptions comprising one or more data item and one or more associated metadata items,
   a plurality of user agents stored in memories, each user agent being associated with one or more of the plurality of data subscriptions, and
   one or more user terminals having one or more hardware processors,
   the one or more user terminals being connected to the first data store via a communications interface;
   the system being configured, in use, such that:
      the user agents transmit a bid for system resources for the one or more associated data subscriptions to the resource allocation manager; and
      the resource allocation manager selects one or more data subscriptions from the plurality of data subscriptions in accordance with the received bids for system resources; the selected one or more data subscriptions cause data to be selected from the one or more further data stores and transferred to the first data store, such that said data can be analyzed using the one or more user terminals.

7. A system according to claim 6, wherein the system resources comprises data storage capacity and/or processing means capacity.

8. A system according to claim 6 wherein the system is further configured, in use, to periodically update the data associated with the selected one or more data subscriptions and transferred to the first data store.

9. A system according to claim 6 wherein the one or more data subscriptions are constructed from data relating to a social media network entity.

10. A system according to claim 9, wherein the data relating to a social media network entity may comprise one or more further social media entities.

11. A system according to claim 6 wherein the one or more data subscriptions comprise one or more keywords.

12. The system according to claim 6, wherein at least one of the data subscriptions is generated automatically by detecting a reference to a data generating entity or person.

13. The system according to claim 6, wherein at least one of the data subscriptions is generated automatically by detecting that use of a particular word has crossed a threshold of frequency of use by that particular word.

14. The system according to claim 6, wherein at least one of the data subscriptions is generated automatically by detecting that use of a particular word has crossed a threshold of number of occurrences by that particular word.

* * * * *